United States Patent
Galasso

(10) Patent No.: US 7,045,707 B1
(45) Date of Patent: May 16, 2006

(54) SURFACE MOUNTED PERIMETER RACEWAY OFFSET ASSEMBLY

(75) Inventor: Marc Galasso, Beacon Falls, CT (US)

(73) Assignee: The Wiremold Company, West Hartford, CT (US)

( * ) Notice: Subject to any disclaimer, the term of this patent is extended or adjusted under 35 U.S.C. 154(b) by 0 days.

(21) Appl. No.: 11/111,578

(22) Filed: Apr. 21, 2005

Related U.S. Application Data

(63) Continuation-in-part of application No. 11/074,312, filed on Mar. 7, 2005.

(51) Int. Cl.
*H02G 3/04* (2006.01)
(52) U.S. Cl. .................. 174/48; 174/68.1; 174/68.3; 52/220.1; 52/220.7; 439/207
(58) Field of Classification Search .................. 174/48, 174/49, 68.1, 68.3, 58, 97, 70 R, 95, 101, 174/72 A, 72 R, 72 C, 96; 439/211, 207, 439/216, 215, 210; 220/3.2, 3.3, 3.8, 4.02; 52/220.1, 220.3, 220.5, 220.7, 239
See application file for complete search history.

(56) References Cited

U.S. PATENT DOCUMENTS

| | | | |
|---|---|---|---|
| 5,469,893 A * | 11/1995 | Caveney et al. | 174/68.3 |
| 5,995,699 A * | 11/1999 | Vargas et al. | 385/134 |
| 6,344,611 B1 * | 2/2002 | Ewer et al. | 174/48 |
| 6,642,445 B1 * | 11/2003 | Lalancette | 174/48 |
| 6,756,539 B1 * | 6/2004 | VanderVelde | 174/48 |
| 6,756,544 B1 * | 6/2004 | Handler | 174/68.3 |
| 6,759,589 B1 * | 7/2004 | VanderVelde | 174/48 |
| 6,936,766 B1 * | 8/2005 | Galasso | 174/48 |
| 6,972,367 B1 * | 12/2005 | Federspiel et al. | 174/48 |
| 2003/0089515 A1* | 5/2003 | Federspiel et al. | |

* cited by examiner

*Primary Examiner*—Angel R. Estrada
(74) *Attorney, Agent, or Firm*—McCormick, Paulding & Huber LLP

(57) ABSTRACT

Internal and external elbow base fittings have longer sides or legs that can be selectively severed at lines of weakening to make up the raceway base. The offset assembly also includes cover components that snap onto these elbow base fittings, and may match the perimeter raceway system with which the offset assembly is used.

13 Claims, 4 Drawing Sheets

SURFACE MOUNTED PERIMETER RACEWAY OFFSET ASSEMBLY

CROSS REFERENCE TO RELATED APPLICATIONS

This application is a continuation-in-part of Ser. No. 11/074,312, filed Mar. 7, 2005 and incorporates by reference and Ser. No. 11/035,477 filed on Jan. 13, 2005 entitled "Modular Raceway with Base and Integral Divider".

BACKGROUND OF THE INVENTION

This invention relates generally to raceway of the type adapted for surface mounting to perimeter walls, and deals more particularly with a unique offset assembly for such raceway so that jogs in the wall structure can be accommodated. The unique offset assembly is designed to allow for variations in the dimensions of the wall offset with minimal precision cutting of components during the installation process.

Perimeter surface mounted raceway generally requires the use of internal and external elbow fittings that must be coupled with precision cut raceway base and cover components in order to fabricate, in the field, an offset fitting of appropriate dimension during installation of the raceway around the perimeter of a room or work space.

SUMMARY OF INVENTION

The present invention resides in a perimeter raceway system for a wall structure wherein the wall structure includes generally parallel planar walls that are offset from one another by a generally perpendicular jog in the wall, or other obstruction, that interrupts the installation of linear raceway. The present invention provides internal and external raceway base elbow elements which are of generally L-shape such that one leg of each base elbow is oriented in line with one of the parallel walls to which the raceway is mounted. Each such base elbow element also includes a second leg oriented perpendicular the one leg. A second leg of at least one elbow element has a length exceeding that of the offset between the parallel wall surfaces, that is uniquely designed so that this second leg can be selectively reduced in length to match the offset of the wall surfaces. A series of relatively simple steps can be accomplished in the field, with a minimum of expenditure of time and effort as compared to that now required with conventional internal and external elbow fittings. The need to fabricate very short conventional raceway runs between standard internal and external elbow fittings is obviated with the unique assembly of this disclosure. Even standard elbow fittings used without any short connector base portion cannot provide the range of offsets possible with the present invention.

The present invention will be described with reference to a novel modular raceway system of the type described in copending application Ser. No. 11/035,477 filed Jan. 13, 2005 entitled "Modular Raceway with Base and Integral Divider", and assigned to The Wiremold Company of West Hartford, Conn. However, other styles of raceway can also benefit from an offset fitting assembly constructed in accordance with the present invention. Raceway offset fitting assembly cover components are also provided to complement the particular raceway style and geometry which is being installed. This feature allows the invention to have broader applicability than utilization with the modular raceway of said copending patent application.

DETAILED DESCRIPTION OF THE FIRST EMBODIMENT

In the above-mentioned copending patent application a modular raceway system is disclosed having a raceway base that is of T-shape in cross section, and provides a generally flat base plate for mounting to a wall structure. The stem of the T-shape projects forwardly from the wall to provide a divider between separated wireways that accommodate power cables and data/communication cables in isolated relationship to one another, each in its own wireway.

Covers for such a T-shaped raceway base are also disclosed in the aforementioned copending patent application and separately mount to the base. The covers have a generally L-shape cross section and combine with one another to provide a front wall for the overall raceway that has a generally convex configuration. See for example the phantom lines shown in FIG. 3 where such a raceway is illustrated for reference purposes.

Figure 1:
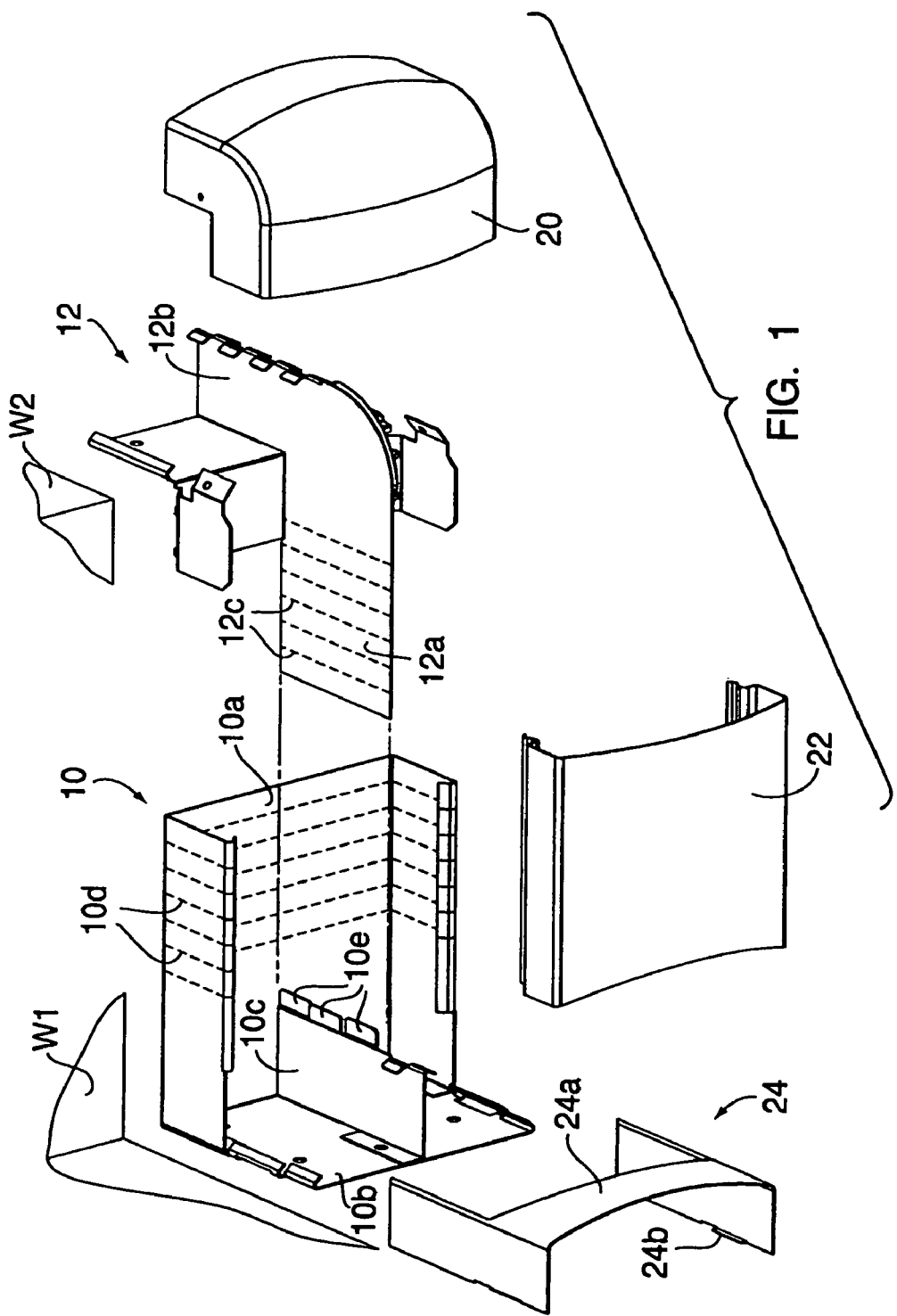
FIG. 1 shows the various components of an offset fitting constructed in accordance with the present invention, these components being illustrated in exploded relationship to one another.

Referring now more particularly to FIG. 1 of the drawings, an internal raceway base elbow element 10 has an overall general L-shape with generally perpendicular leg portions, one of which 10a is of channel shape cross section. The shorter of the two legs 10b is of generally T-shape in cross section. This T-shape is chosen to match the T-shape of the modular raceway base component with which the fitting of FIG. 1 is used (See FIG. 3 and see as well the above-mentioned co-pending application). Thus, the shorter leg 10b is aligned with the raceway 100, mounted on the wall W1.

Again with reference to FIG. 1, an external raceway base elbow element 12, also of L-shape has mutually perpendicular legs of the L that cooperate to define the external 90° elbow. More particularly, the external elbow element 12 includes one leg portion 12b so oriented as to be aligned with the T-shaped raceway base of the modular raceway 200 on the wall surface W2 that is parallel to the wall surface W1 mentioned previously and associated with raceway assembly 100.

Thus, the internal and external raceway base elbow elements 10 and 12 respectively are each of L-shape, and one leg of each L-shape is oriented in line with one of the parallel but spaced raceways 100 and 200 mounted on the parallel but offset walls (W1 and W2). Theses raceways are of the type described in said co-pending patent application.

Still with reference to FIG. 1 the second leg 12a of the L-shaped external elbow element 12 fits into the channel shaped second leg 10a of the internal base elbow element 10 as suggested by the phantom lines of FIG. 1. The divider portion 12a of the external raceway base elbow element 12 may include lateral lines of weakening such that the length of this divider wall can be reduced from a predetermined manufactured length by the workman in the field who installs the assembly of the present invention. Alternatively, this divider portion 12a can be severed on site. So too, the second leg 10a of the internal raceway elbow element 10, although of channel shape, may also provided with lines of weakening so as to allow reductions in its overall length from a nominal manufactured design length. The workman in the field may break away excess portions thereof to match the length of the divider wall 12a to that of the channel leg 10a of elbow element 10, or cut this channel shaped leg to match the offset required during installation.

Figure 2:
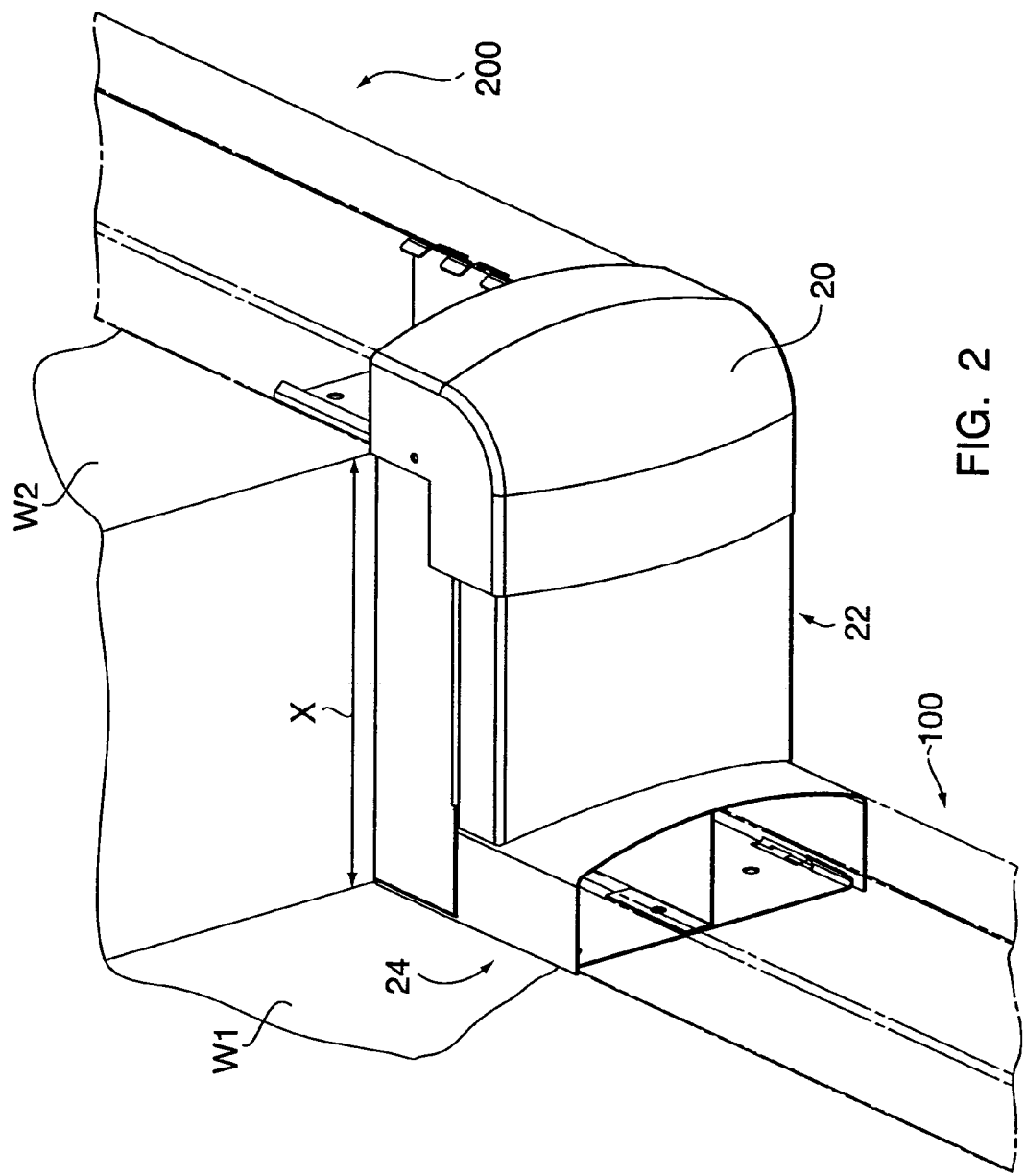
FIG. 2 illustrates the components of FIG. 1 in assembled condition with parallel raceway runs illustrated in phantom lines for reference purposes, and with parallel but offset wall surfaces W1 and W2.

The assembly is shipped in the configuration shown in FIG. 2. The installer can disassemble the assembled unit, and break away or sever portions of the channel shaped second leg 10a of the internal raceway elbow element 10, doing the same with the divider wall 12a of the external raceway base elbow element. Providing a prefabricated offset assembly that avoids the time consuming task of fabricating in the field an offset raceway run between parallel raceway sections on parallel wall surfaces, or around obstructions to the straight raceway runs 100/200.

While the above-described elbow elements serve to efficiently couple one raceway 100 to a second raceway 200, it is also necessary to provide covers for these components that match the raceway system with which it is used. It is a feature of the present invention, however, that the above-described elbow base elements need not actually match the raceway with which they are used, and can be quite readily adapted to accommodate raceway of different geometries.

Figure 3:
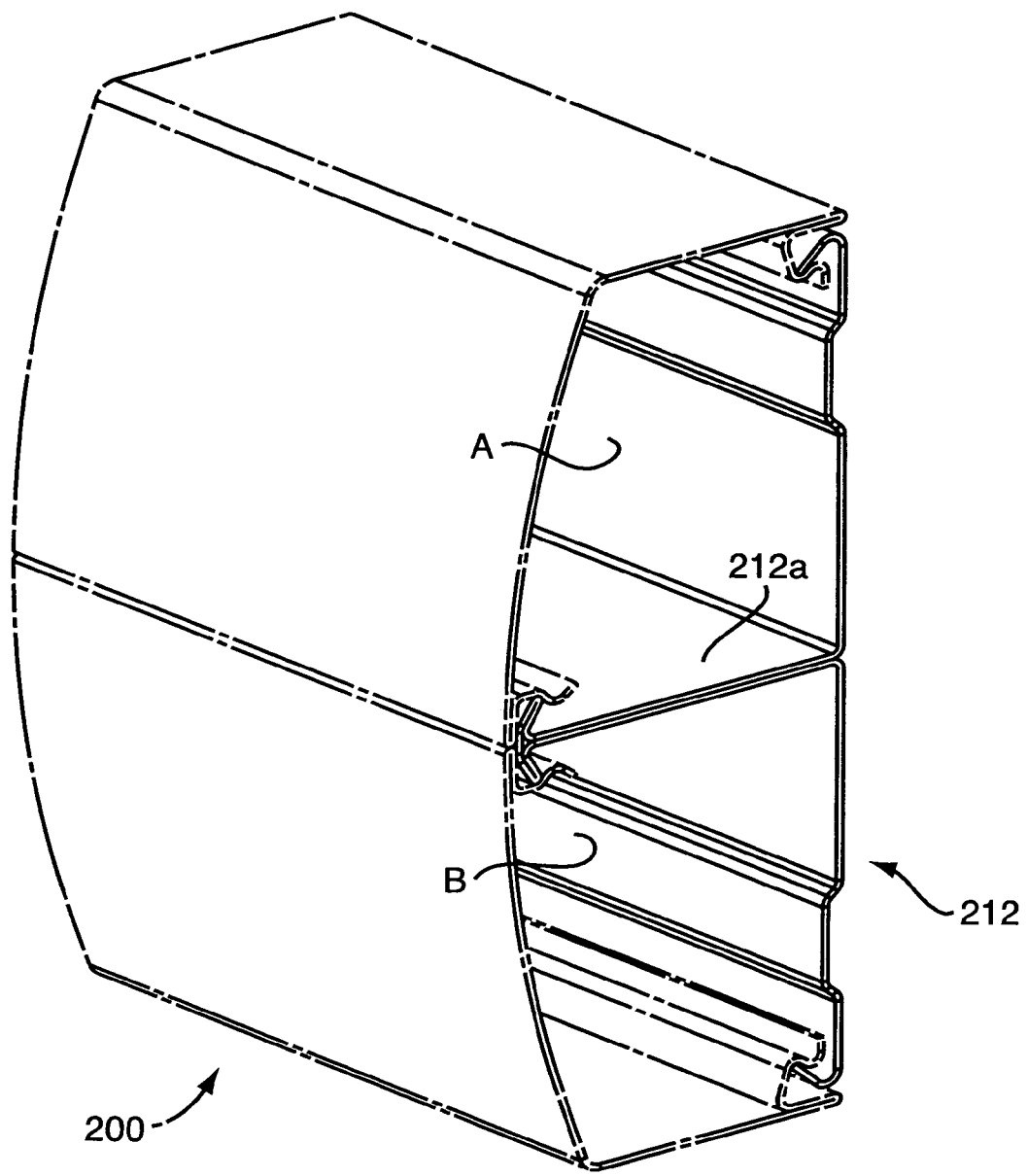
FIG. 3 is taken from the copending application to illustrate the details of a raceway system suitable for the offset assembly shown in FIGS. 1 and 2.

In accordance with the embodiment of FIGS. 1–3 the offset raceway assembly is preferably intended for use with raceway of the type described in the aforementioned copending patent application. Therefore, an external corner elbow cover 20 is provided to match the external configuration of the raceway cover on the raceway 200, and a C-shaped raceway cover 22 emulates the paired raceway covers of the raceway 200, but is adapted to engage the flanges of the channel shaped base leg portion 10a of elbow 10. This cover 22 must also be cut to fit the offset dimension for the wall offset itself. The channel 10a and divider portion 12a of the internal and external base elements may be cut in a conventional fashion by the installer but the lines of weakening are provided on these elements to make it possible to fit the components in place as a preliminary initial mock-up arrangement.

Assuming that the raceway 100 is identical to the raceway 200 a fitted cover clip 24 is received on the T-shaped base leg 10b of the internal elbow element 10. The arcuate center portion thereof 24a is quite short in longitudinal extent along the direction of raceway 100 so as to serve only as a way of avoiding an arcuate cut in the raceway covers associated with the elongated raceway 100. Tabs 24b on the side portions of the cover clip 24 serves to anchor this cover clip 24 on the wall mounted leg 10b of the internal corner element 10.

To summarize the steps taken in installing the assembly of FIG. 2 once the installer has run the perimeter raceway to the offset wall described above, the installer may follow these general steps:

Take a measurement of the wall offset itself, and select an appropriate line of weakening in both the divider wall 12a and in the channel shaped leg 10a of the elbow elements 12 and 10 respectively to shorten these legs so they correspond to the offset between the walls W1 and W2;

Installing the elbow elements on the offset wall in line with the raceways 100 and 200, followed by;

Installing the external cover 20 and the internal cover clip 24 so that the short cover 22 can be cut to fit between these covers 20 and 24.

FIG. 3 shows a modular raceway of the type described in the aforementioned pending patent application entitled "Modular Raceway with Base and Integral Divider". It is with such a raceway that the present invention is specifically designed for use, but it will of course be apparent that other raceways might also be provided with an offset assembly of the invention. While the external covers might be of different configuration to match the covers on the raceway, the offset assembly can nevertheless be as described.

As shown in FIG. 3 divider 212a is provided integrally with the raceway base 212 in the raceway 200. The raceway covers are illustrated in broken lines as separate components defining separate wireways A and B in cooperation with the base 212. Thus, the raceway offset assembly of FIG. 1 includes an integral divider 12a in the external corner base element 12, and/or divider shown generally at 10c in the internal corner base element 10. The dividers in both corner elbow elements are adapted to be aligned with the divider 212a in the longitudinally extending raceway 200, and with a divider in the equivalent raceway 100 on the other wall. In connection with the internal offset elbow element 10, and more particularly with respect to the longer leg 10a, lines of weakening are indicated generally at 10d in order to accommodate offsets of various dimension (see the reference to this variable indicated as "X" in FIG. 2). Similar lines of weakening 12c are indicated for the longer leg in the external offset base elbow 12. It will be apparent that the overall length of these internal and external element leg portions must be reduced in length to accommodate the offset "X" in the wall to be fitted with this assembly. After breaking away the legs 10a and 12a to the desired offset length "X" it will be apparent that the free edge portion of the divider 12a can be fit between tabs 10e, 10e that are formed to receive the end portion of leg 12a when these elbow elements are assembled with on another.

It will be apparent also that the shorter leg portion 12b of the external corner element 12 is adapted to receive the covers of the raceway 200 as suggested in FIG. 2. More particularly, the shorter leg portion 12b of the external corner elbow 12 receives these covers of the modular raceway of the above-mentioned copending patent application. In the event other raceways are to be accommodated with an offset assembly of the present invention this leg 12b of the offset assembly would then be formed to mate with the configuration for the particular raceway base. Thus, the external corner cover member 20 is configured to match the modular raceway of the above-identified copending application. Here again, this component could be configured differently to match raceways of different cover configuration in the event an offset assembly of the invention where used with raceways of more conventional geometry (see for example the current 4000 series raceway manufactured by The Wiremold Company of West Hartford, Conn.).

The cover clip 24 associated with the shorter leg 10b of the internal corner elbow element 10 is also designed to match a particular raceway. Other configurations for this element 24 can be so formed as to mate with raceways of various cover configurations.

DETAILED DESCRIPTION OF THE PREFERRED EMBODIMENTS (FIGS. 4–5)

Figure 4:
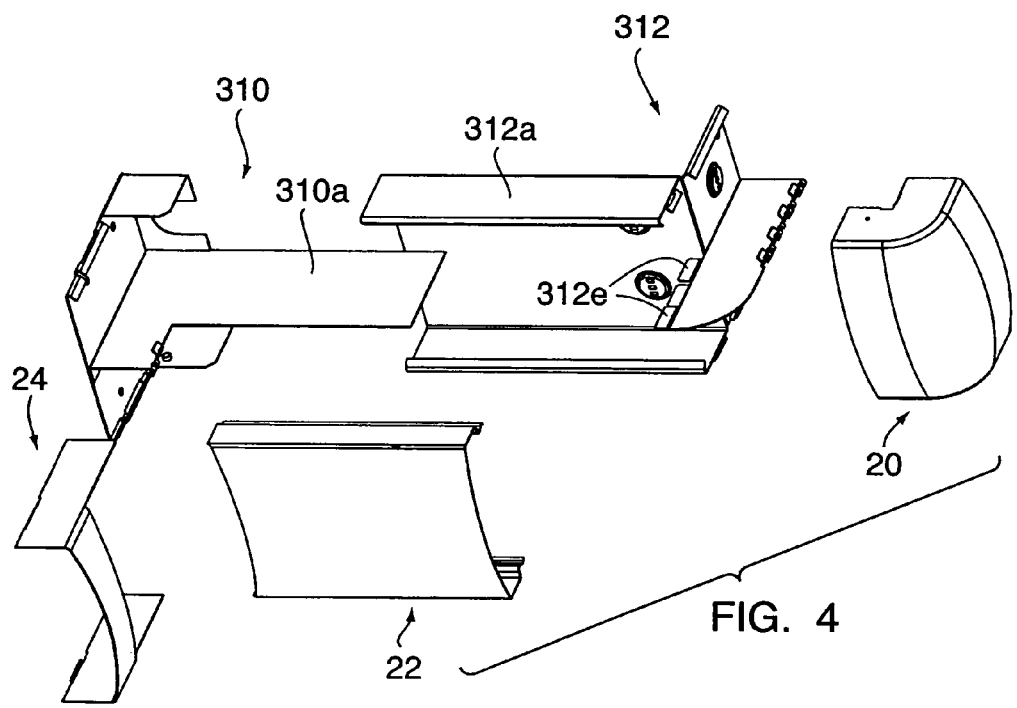
FIG. 4 shows the various components of an offset fitting constructed in accordance with an alternative embodiment of the present invention, the various components being illustrated in exploded relationship to one another in a manner similar to that of FIG. 1.
Figure 5:
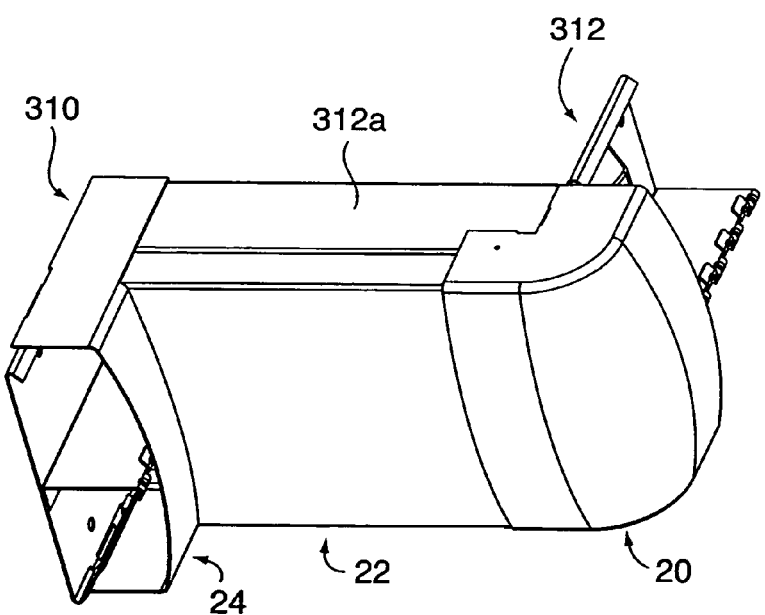
FIG. 5 is a view of the components illustrated in FIG. 4 assembled with one another in kid form for use buy the installer in the field.

FIGS. 4 and 5 illustrate a second preferred embodiment of the present invention that is similar to the first mentioned embodiment of FIGS. 1–3, especially when seen in assembled condition (compare FIGS. 5 and 2, for example).

However, instead of providing the external elbow element 312 with the longer leg divider (12a) the longer leg forms the channel shaped base 312a (corresponding to the channel base of the longer leg of the internal elbow element 10 of the first embodiment).

By the same token, the internal elbow element 310 has its longer leg 310a defining the divider (which corresponds to the divider 12a of the first embodiment).

While lines of weakening can also be provided in the embodiment of FIGS. 4 and 5, the length of time required by the installer to take the preassembled unit of FIG. 5 and to disassemble it so as to be measured for cutting to fit an offset (x) as described above can be reduced sufficiently without these lines of weakening, and therefore the lines of weakening have been found to be an unnecessary element of the present invention. In short, the advantages to the present invention can also be realized without providing lines of weakening as described previously with reference to the first embodiment.

Thus, it will be apparent that the divider 310a of the internal elbow has an end portion that mates with tabs 312e of the external elbow divider for the same reason and purposes as described previously with reference to the first embodiment.

Finally, it is noted that the external cover 20 in FIG. 4 may be identical to that described previously with reference to FIGS. 1, 2, and 3, as is the case with the offset race way cover component 22 and a.e. cover clip 24. Thus, the cover components themselves can be chosen to match closely the race way cover components associated with the race way runs 100 and 200 (which may or may not be similar to those described in the above-mentioned copending patent application incorporated by reference herein.

This invention's scope shall be determined by the appended claims, and may be practiced otherwise than as specifically described. For example, two offset assemblies can be used to run raceway around an obstruction offset in an otherwise continuous wall structure.

The invention claimed is:

1. An offset assembly for a perimeter raceway system having offset raceway runs, said assembly comprising:
   an internal and an external elbow base element, each said base element being of L-shape with a first leg adapted for alignment with a raceway run and a second elbow base element leg of length greater than said first leg, said first and second elbow base element legs being perpendicular to one another,
   said second leg of at least one of said internal and external elbow base elements having laterally spaced lines of weakening.

2. The offset assembly of claim 1 further comprising internal and external base cover elements, said base cover elements having an external contour that matches the external contour of the raceway runs between which the offset assembly is to be fitted.

3. The offset assembly of claim 1 wherein said elbow base elements having said first leg oriented in line with the raceways so configured as to match the cross-sectional configuration of a raceway base provided in said raceways.

4. The offset assembly of claim 3 wherein one of said elbow base element first leg has a cross section of T-shape such that an integral divider is defined by a web on said first leg, and wherein said external elbow base element is provided with a web that defines a divider portion extending along said second leg.

5. The offset assembly of claim 4 wherein said second leg of said internal elbow base element has a channel shaped cross section with sidewalls, and said divider portion of the second leg of said external elbow base element located between the channel sidewalls of said channel shaped second leg of said internal elbow base element.

6. The offset assembly of claim 5 wherein said integral divider of said one leg of said internal elbow base element is fitted with offset tabs to receive a free end portion of the divider portion of the second leg of said external elbow base element.

7. An offset assembly for a perimeter raceway system having raceway runs that are offset by a given dimension, said assembly comprising:
   an internal and an external elbow base element, both said base elements being of L-shape with a first leg adapted for alignment with a raceway run and a second elbow base element leg of length greater than said first leg,
   said second leg of at least one of said internal and external elbow base elements having a length exceeding that of the offset, whereby said second leg can be cut to match that given dimension.

8. The offset assembly of claim 7 wherein the one of said internal and external raceway elbow base elements has a second leg perpendicular to the first leg thereof, and said second leg being generally of the same length as said second leg of said other of said elbow base elements that allows matching said second leg lengths by cutting said second legs to match said given dimension.

9. The offset assembly of claim 7 further comprising internal and external base cover elements, said cover elements having an external contour that matches the external contour of the raceway runs between which the offset assembly is to be fitted.

10. The offset assembly of claim 7 wherein said elbow base elements having said first leg oriented in line with the raceways so configured as to match the cross-sectional configuration of a raceway base provided in said raceways.

11. The offset assembly of claim 9 wherein one of said elbow base element first leg has a cross section of T-shape such that an integral divider is defined by a web on said first leg, and wherein said external elbow base element is provided with a channel shaped second leg.

12. The offset assembly of claim 11 wherein said second leg of said internal base element is provided with a web that defines a divider portion extending along said second leg, said second leg being provided between side walls of said channel shaped second leg of the external elbow base element.

13. The offset assembly of claim 12 wherein said integral divider of said first leg of said external base element is fitted with offset tabs to receive a free end portion of the divider portion of said second leg of said internal elbow base element.

* * * * *